US012640910B2

(12) United States Patent
Morita et al.

(10) Patent No.: US 12,640,910 B2
(45) Date of Patent: May 26, 2026

(54) INFORMATION PROCESSING DEVICE AND KEY MANAGEMENT DEVICE

(71) Applicant: Hitachi Astemo, Ltd., Hitachinaka (JP)

(72) Inventors: Nobuyoshi Morita, Tokyo (JP); Mikio Kataoka, Tokyo (JP); Yasuhiro Fujii, Tokyo (JP); Masashi Yano, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 79 days.

(21) Appl. No.: 18/710,233

(22) PCT Filed: Aug. 10, 2022

(86) PCT No.: PCT/JP2022/030516
§ 371 (c)(1),
(2) Date: May 15, 2024

(87) PCT Pub. No.: WO2023/089882
PCT Pub. Date: May 25, 2023

(65) Prior Publication Data
US 2025/0007697 A1 Jan. 2, 2025

(30) Foreign Application Priority Data

Nov. 19, 2021 (JP) ................................. 2021-188976

(51) Int. Cl.
*H04L 9/08* (2006.01)
*G06F 21/74* (2013.01)

(52) U.S. Cl.
CPC ............ *H04L 9/0822* (2013.01); *G06F 21/74* (2013.01); *H04L 9/0861* (2013.01); *H04L 9/0891* (2013.01); *H04L 9/0894* (2013.01)

(58) Field of Classification Search
CPC ... H04L 9/0822; H04L 9/0861; H04L 9/0891; H04L 9/0631; H04L 9/0894;
(Continued)

(56) References Cited

U.S. PATENT DOCUMENTS 9,042,553 B2 * 5/2015 Hashimoto ........... H04L 9/0825
380/279
10,156,604 B2 * 12/2018 Lee ................... G01R 31/31719
(Continued)

FOREIGN PATENT DOCUMENTS

| JP | 2012-186553 A | 9/2012 |
| JP | 5224512 B2 | 7/2013 |
| JP | 6683588 B2 | 4/2020 |

OTHER PUBLICATIONS

International Search Report with English Translation and Written Opinion of International Patent Application No. PCT/JP2022/030516 dated Oct. 25, 2022 (9 pages).

*Primary Examiner* — Shaqueal D Wade-Wright
(74) *Attorney, Agent, or Firm* — Foley & Lardner LLP

(57) ABSTRACT

The present disclosure provides an information processing device and a key management device capable of safely writing key information even in a manufacturing environment other than a manufacturing environment of its own company. An information processing device 1 that generates and manages a key includes a storage unit 100 that stores a public key received from a key management device 3, a key generation unit 13 that generates a use key, and a communication unit 11 capable of communicating with the outside. The key generation unit 13 generates a use key in an invalid state in which the communication unit 11 blocks signal input from the outside. The communication unit 11 transmits the use key encrypted with the public key to the key management device 3.

13 Claims, 9 Drawing Sheets

(58) Field of Classification Search
CPC ....... H04L 9/3247; H04L 9/0643; H04L 9/08;
H04L 9/06; H04L 9/088; H04L 63/062;
H04L 63/068; H04L 63/06; G06F 21/70;
G06F 21/71; G06F 21/72; G06F 21/74;
G06F 21/75
See application file for complete search history.

(56)                    References Cited

U.S. PATENT DOCUMENTS

| | | | |
|---|---|---|---|
| 2007/0005512 A1* | 1/2007 | Nishiguchi | G06F 21/72 |
| | | | 705/71 |
| 2010/0303239 A1* | 12/2010 | James | G06F 11/3656 |
| | | | 711/E12.008 |
| 2012/0224695 A1 | 9/2012 | Hashimoto et al. | |
| 2014/0258736 A1 | 9/2014 | Merchan et al. | |
| 2019/0245691 A1 | 8/2019 | Takemori et al. | |
| 2020/0195432 A1* | 6/2020 | Doll | G06F 21/79 |
| 2020/0374109 A1* | 11/2020 | Raza | H04L 63/062 |

* cited by examiner

START

ACQUIRE EVIDENCE TARGET INFORMATION ~ 401

GENERATE EVIDENCE ~ 402

STORE EVIDENCE ~ 403

END

| COMMON KEY SLOT ID | KEY INFORMATION |
|---|---|
| 0x01 | $K_{0x01}$ |
| 0x02 | $K_{0x02}$ |
| . . . | . . . |

1013                                          1014

| PUBLIC KEY PAIR ID | KEY INFORMATION |
|---|---|
| 0x0100 (SECRET KEY) | $K_{0x0100}$ |
| 0x0101 (PUBLIC KEY) | $K_{0x0101}$ |
| . . . | . . . |

1015                                          1016

| SECRET COMMUNICATION PUBLIC KEY ID | KEY INFORMATION |
|---|---|
| 0x010 | $K_{0x010}$ |

FIG. 6

| 1021 | 1022 | 1023 |
| --- | --- | --- |
| RULE ID | VERIFICATION TARGET | PRESCRIBED STATE |
| 0x01 | JTAG | INVALID |
| 0x02 | USB | INVALID |
| 0x03 | UART | INVALID |
| 0x04 | Wi—Fi | INVALID |
| 0x05 | CAN | VALID |
| 0x06 | Ethernet | INVALID |
| • • • | • • • | • • • |

FIG. 7

| 1031 | 1032 |
| --- | --- |
| EVIDENCE TARGET ID | EVIDENCE CONTENT |
| 0x01 | LIST OF GENERATED KEYS |
| 0x02 | SECRET COMMUNICATION PUBLIC KEY |
| 0x03 | VERIFICATION TARGET STATE INFORMATION |
| 0x04 | TIME INFORMATION |
| • • • | • • • |

*FIG. 8*

| 1041 | 1042 |
|---|---|
| EVIDENCE ID | EVIDENCE INFORMATION |
| 0x01 | $E_{0x01}$ |

FIG. 11

| PRODUCT ID | KEY SLOT ID | KEY TYPE | KEY INFORMATION |
|---|---|---|---|
| | 3711 | 3712 | 3713 | 3714 |

| PRODUCT ID | KEY SLOT ID | KEY TYPE | KEY INFORMATION |
|---|---|---|---|
| A41 | 0x01 | INDIVIDUAL | — |
| | 0x02 | INDIVIDUAL | — |
| | 0x03 | SHARED | $K_{0x03}$ |
| | · · · | · · · | · · · |
| · · · | · · · | · · · | · · · |

INFORMATION PROCESSING DEVICE AND KEY MANAGEMENT DEVICE

TECHNICAL FIELD

The present invention relates to an information processing device that generates and manages a key and a key management device that manages a key.

BACKGROUND ART

Various security countermeasures are being applied as countermeasures against a cyberattack on automobiles. Among such countermeasures, security countermeasures utilizing encryption technology are important not to compromise key information to be used. Therefore, it is required to protect such key information from the manufacturing process to the life cycle of the product. In particular, an EMS (electronics manufacturing service) is increasingly used as a production site of a product. Even in a manufacturing environment in which there is a possibility that its own company's control does not work like the EMS, it is required to safely write key information with confidentiality in a product. Here, in the present specification, the key described above is referred to as a "use key" (also simply referred to as a "key") in order to be distinguished from a key used for encryption/decryption.

As a technique for writing a new key to a device (electronic control unit (ECU)) mounted on a vehicle, PTL 1 discloses a technique in which a server verifies a secure boot result calculated in advance based on key information mounted on the ECU, a key is transmitted according to the verification result, and the ECU writes the key information. In addition, PTL 2 discloses a technique of generating a random number after invalidating a debug port, encrypting the random number and transmitting the random number to a key issuing server, and acquiring an individual key encrypted by the random number from the key issuing server.

CITATION LIST

Patent Literature

PTL 1: Japanese Patent No. 6683588
PTL 2: Japanese Patent No. 5224512

SUMMARY OF INVENTION

Technical Problem

However, in the conventional technique, the use key is not mounted on the ECU at the start of manufacturing. That is, the manufacturing process includes a process of mounting the use key on the ECU.

At this time, when use key information is simply transmitted to a manufacturing environment of a third party together with software written in the ECU, a person involved in the manufacturing environment can easily access the use key information. In addition, it is desirable to be able to explain whether or not the use key has been correctly written in the manufacturing process when the use key is compromised in order to clarify the responsible division of its own company. Furthermore, the technology of PTL 2 is characterized in that the individual key is generated on the key issuing server side instead of the ECU, and thus the EMS cannot be utilized. In addition, since a key can be generated a plurality of times by resetting the generated random number, the risk of key compromise increases.

The present invention has been made in view of the above problems, and an object of the present invention is to provide an information processing device and a key management device capable of safely writing use key information and explaining that use key information has been written in a correct situation even in a manufacturing environment in which its own company's control is not effective.

Solution to Problem

An example of an information processing device capable of generating and managing a key according to the present invention includes a storage unit that stores a public key received from a key management device, a key generation unit that generates a use key, and a communication unit capable of communicating with the outside. The key generation unit generates a use key in an invalid state in which the communication unit blocks signal input from the outside. The communication unit transmits the use key encrypted with the public key to the key management device.

Advantageous Effects of Invention

The Information processing device according to the present invention can be expected to prevent leakage of a key and suppress an unauthorized act by generating a key only in a predetermined situation where interference from the outside is not received.

BRIEF DESCRIPTION OF DRAWINGS

FIG. 5 is a diagram illustrating a data structure of key-related information.

FIG. 6 is a diagram illustrating a data structure of key generation condition rule information.

FIG. 7 is a diagram illustrating a data structure of evidence target information.

FIG. 8 is a diagram illustrating a data structure of evidence information.

FIG. 11 is a diagram illustrating a data structure of key master information.

DESCRIPTION OF EMBODIMENTS

Hereinafter, embodiments of the present invention will be described in detail with reference to the drawings using the embodiments.

First Embodiment

[Information Processing Device 1]

In the present embodiment, an example of an information processing device 1 that implements a method of safely writing key information for security countermeasures in a manufacturing process of an information processing device mounted on an automobile will be described. However, the technical idea of the present invention is not limited to this embodiment.

Figure 1:
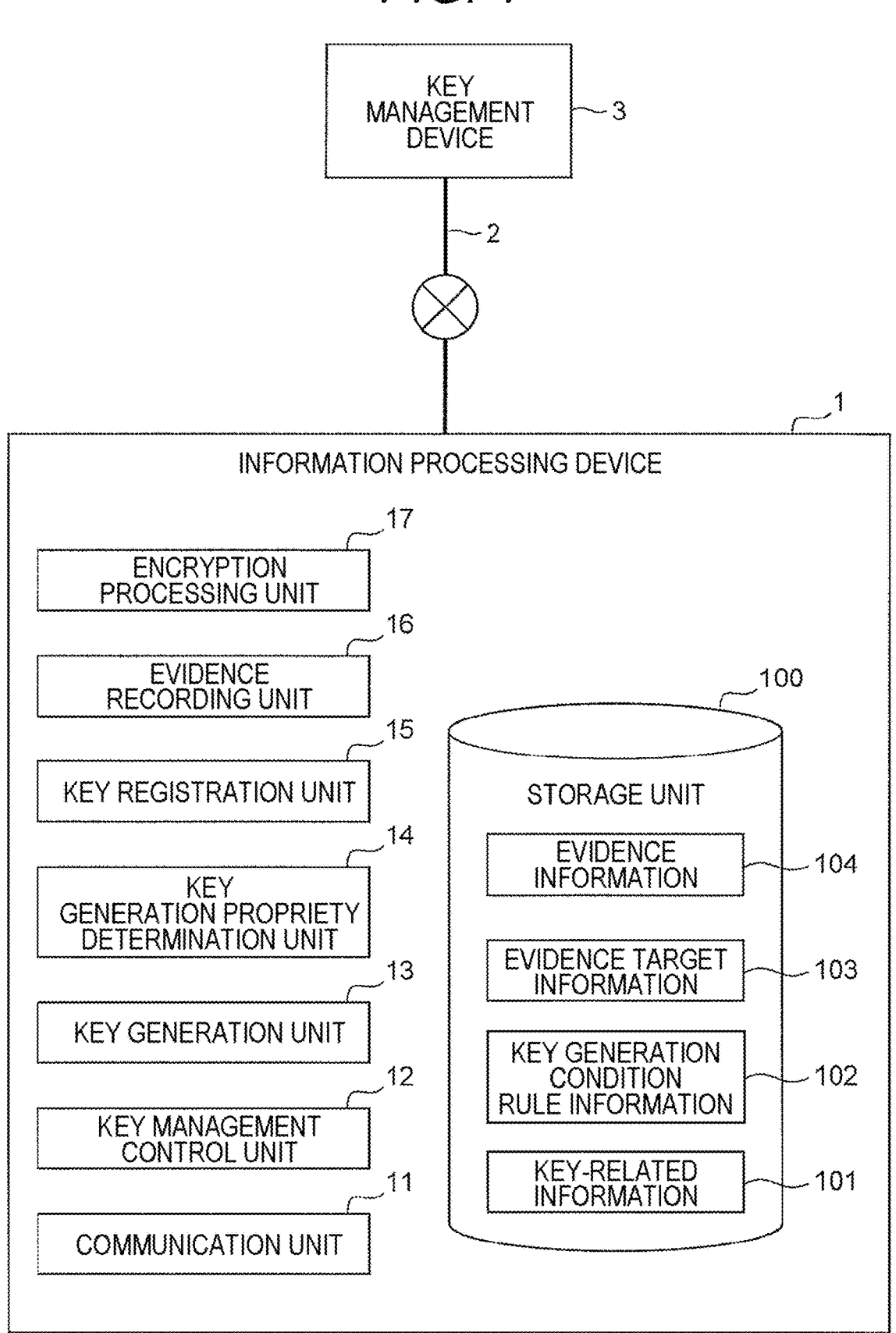
FIG. 1 is a diagram illustrating a configuration of an information processing device according to a first embodiment of the present invention.

FIG. 1 illustrates a configuration of the information processing device 1 according to the present embodiment. The Information processing device 1 is, for example, a device that is mounted on a vehicle and controls the vehicle. However, the information processing device 1 may be installed outside the vehicle or may be a device that controls a target other than the vehicle.

In the manufacturing process, the information processing device 1 is connected to a key management device 3 via a communication bus 2. The communication bus 2 is connected by, for example, a LAN cable, and may perform communication based on Ethernet (registered trademark) or may perform wireless communication according to a predetermined standard.

The Information processing device 1 includes calculation means (not illustrated) and storage means (not illustrated). The calculation means includes, for example, a central processing unit (CPU). The storage means includes, for example, a non-volatile memory and a volatile memory. The calculation means executes the program stored in the storage means, whereby the information processing device 1 implements the functions described in the present specification.

For example, the information processing device 1 includes, as functional units thereof, a key management control unit 12, a key generation unit 13, a key generation propriety determination unit 14, a key registration unit 15, an evidence recording unit 16, and an encryption processing unit 17. In this specification, it can also be said that the processing executed by the CPU or these functional units is processing executed by the information processing device 1.

The Information processing device 1 includes a storage unit 100. The storage unit 100 may be entirely nonvolatile or partially volatile. Furthermore, the information processing device 1 includes a communication unit 11 that is a communication interface and performs calculation necessary for communication.

The functional block diagram illustrated in FIG. 1 is an example, and the unit and name of the function are not limited thereto. For example, the function implemented by the key management control unit 12 in the present embodiment may be implemented by another functional unit illustrated in FIG. 1 or may be implemented by a functional unit not illustrated in FIG. 1.

The communication unit 11 transmits and receives messages to and from the key management device 3 via the communication bus 2. The key management control unit 12 controls whether or not to shift to a key generation mode when receiving a key setting command from the outside. The key generation unit 13 generates a common key and a public key pair. The key generation propriety determination unit 14 determines whether or not the information processing device 1 may generate a key. The key registration unit 15 registers the key information in the storage unit 100. The evidence recording unit 16 records evidence information related to key generation and key registration in the storage unit 100. The encryption processing unit 17 performs encryption processing according to a predetermined algorithm. Hereinafter, processing performed by these functional units will be described in more detail.

The storage unit 100 stores key-related information 101 including a key value used for encryption processing, key generation condition rule information 102 defining a condition in which a key can be generated, evidence target information 103 defining a content to be included in evidence, and evidence information 104 recording evidence information related to key generation and key registration.

The functional block diagram illustrated in FIG. 1 is also an example, and the unit and name of the function are not limited thereto. For example, in the present embodiment, the evidence information 104 may be held by another functional unit illustrated in the storage unit 100 in FIG. 1, or may be held by a functional unit not illustrated in the storage unit 100 in FIG. 1.

Figure 2:
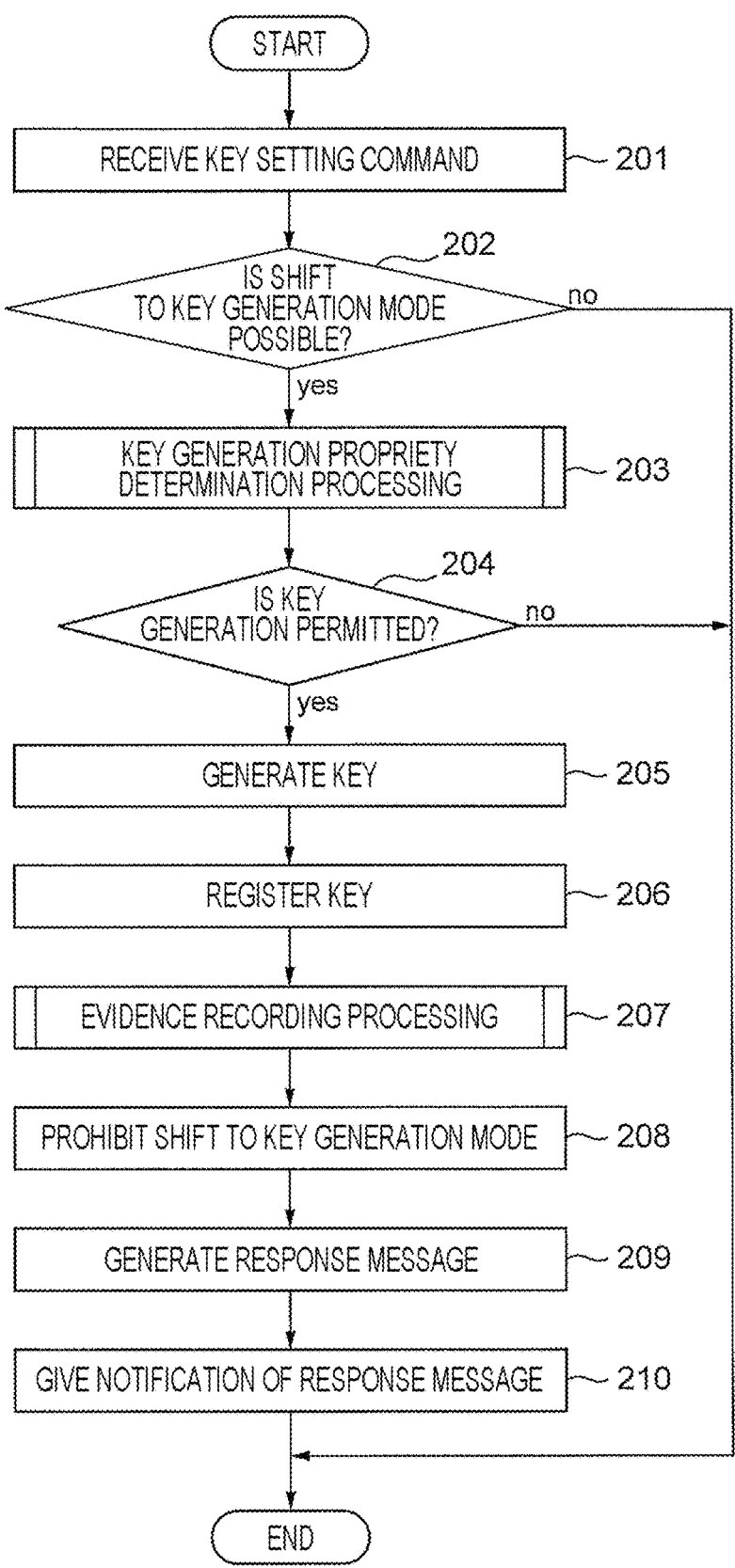
FIG. 2 is a diagram illustrating an outline processing sequence related to key generation and key registration.

FIG. 2 is a sequence illustrating processing from generation of a use key by the information processing device 1 to registration of the use key and notification of the result to the key management device 3. An execution subject of each step described below is, for example, a CPU (not illustrated) of the information processing device 1.

In step 201, the key management control unit 12 receives the key setting command transmitted to the information processing device 1 via the communication unit 11. For example, a device installed in a manufacturing process line may transmit a key setting command, the key management device 3 may transmit a key setting command, and any other method may be used as long as the information processing device 1 receives a predetermined signal.

In step 202, the key management control unit 12 determines whether or not the mode can be shifted to the key generation mode. When the mode can be shifted to the key generation mode, the processing proceeds to step 203. When the mode cannot be shifted to the key generation mode, the processing ends. For example, when the key management control unit 12 or the storage unit 100 includes a key generation mode shift propriety flag and the key generation mode shift propriety flag is "0", it is possible to determine that the mode can be shifted to the key generation mode. When the key generation mode shift propriety flag is "1", it is possible to determine that the mode cannot be shifted to the key generation mode. At this time, an initial value of the key generation mode shift propriety flag may be set to "0" in an initial state where the key generation has never been performed.

In step 203, the key generation propriety determination unit 14 determines propriety of key generation based on the key generation condition rule information 102. Details of the key generation condition rule information 102 will be described later.

In step 204, the key generation propriety determination unit 14 proceeds to step 205 when the key generation is permitted in step 203, and ends this processing when the key generation is not permitted.

In step 205, the key generation unit 13 generates a necessary number of keys. For example, one or more random numbers to be used as a common key are generated. In addition, one or more key pairs of a public key and a private key according to an RSA scheme which is an encryption scheme known as a public key pair may be generated.

In step 206, the key registration unit 15 stores the key-related information 101 related to the key generated in step 205 in the storage unit 100.

FIG. 5 illustrates a data structure of the key-related information 101 related to the key generated in step 205. The key-related information 101 includes a key slot ID 1011 for identifying a common key stored in the key-related information 101, key information 1012 indicating a value of the key, a public key pair ID 1013 for identifying a public key, key information 1014 indicating a value of the key, a secret communication public key ID 1015 indicating a public key used for secret communication with the key management device 3, and key information 1016 indicating a value of the key. For example, in the case of the common key, the area in which the key is stored is a memory area such as a hardware security module (HSM) in which confidentiality and integrity are secured, and in the case of the public key, the area is a memory area having a one time programmable (OTP) function in which integrity is secured or a memory area in which integrity is verified. In addition, regarding the secret communication public key, a secret key to be paired is stored in the key management device 3, and may be provided in advance in a program that is written in the manufacturing process and can perform the processing illustrated in FIG. 2.

In step 207, the evidence recording unit 16 stores the evidence information 104 created in accordance with the evidence target information 103 to be described later in the storage unit 100. Note that the processing of step 207 may be collectively performed at the timing of step 204 and subsequent steps, or the evidence information necessary for each step of step 204 and subsequent steps may be recorded.

In step 208, the key management control unit 12 prohibits key generation by the key generation unit 13 in the subsequent processing. This prevents arbitrary replacement with another key after shipment. Note that this step can be omitted. That is, the key may be generated a plurality of times by the key generation unit 13. In this case, for example, it is also possible to perform processing of setting a threshold for the number of times of key generation and prohibiting key generation when the number of times of generation exceeds a predetermined number of times.

In step 209, the key management control unit 12 generates a response message to the key management device 3 using the encryption processing unit 17. For example, the response message includes the key-related information 101 registered in step 206 and the evidence information 104 recorded in step 207. In addition, the encryption processing unit 17 encrypts a response message including the key-related information 101 and the evidence information 104 using the key information 1016 associated with the secret communication public key ID 1015.

In step 210, the key management control unit 12 notifies the key management device 3 of the encrypted response message generated in step 209 using the communication unit 11. When the key management device 3 receives the response message from the information processing device 1, the key management device 3 decrypts the response message using a secret key to be paired with the key information 1016 associated with the secret communication public key ID 1015, and registers the acquired key-related information 101 and evidence information 104.

Through the above steps, the information processing device 1 can generate a key, then register the key-related information 101 in the storage unit 100, and securely notify the key management device 3 of the generated key-related information and evidence information.

More preferably, by implementing a part or all of the processing from step 202 to step 209 in a secure area such as an HSM in which tamper resistance is secured, it is possible to prevent a cyberattack by an internal criminal or a third party in a manufacturing site.

Figures 3, 4:
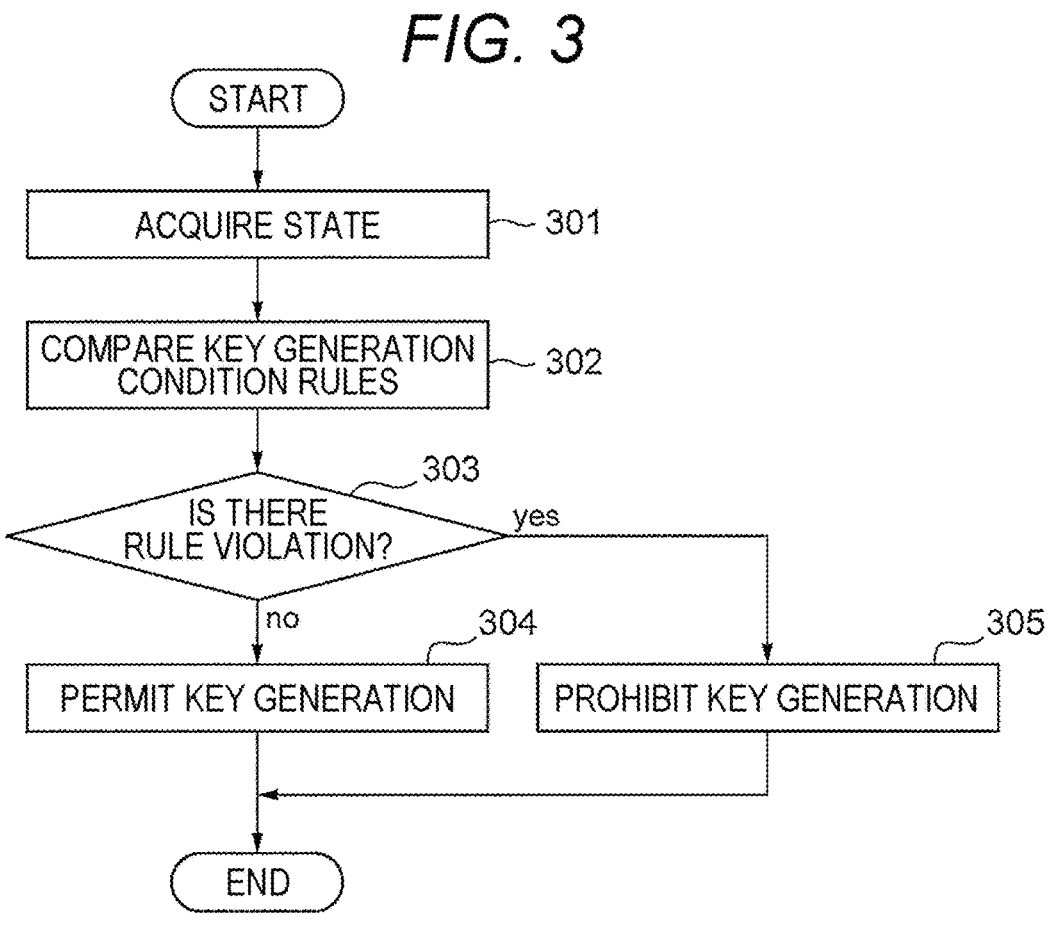
FIG. 3 is a diagram illustrating an outline processing flow of key generation propriety determination.
FIG. 4 is a diagram illustrating an outline processing flow of evidence generation.

FIG. 3 is a flowchart illustrating processing related to key generation propriety determination processing in step 203.

In step 301, the key generation propriety determination unit 14 acquires predetermined state information regarding the information processing device 1. The state information may be included in a program as setting information, may be an execution result of the program, or may be information stored in a register or the like mounted on the information processing device.

In step 302, the key generation propriety determination unit 14 compares the state information acquired in step 301 with the rule stored in the key generation condition rule information 102. Note that, in step 301, the state information of the information processing device 1 may be acquired according to a rule stored in the key generation condition rule information 102.

FIG. 6 illustrates a data structure of the key generation condition rule information 102 referred to in step 302. The key generation condition rule information 102 includes a rule ID 1021 for identifying a key generation condition, a verification target 1022 indicating a verification target regarding the state of the information processing device 1, and a defined state 1023 defining a state to be the verification target 1022. The verification target 1022 is not limited to the illustrated one, and may be a register value or a processing result by the information processing device.

For example, the key generation propriety determination unit 14 acquires a state of the verification target 1022 associated with the rule ID 1021 and compares whether or not the state matches the defined state 1023. Setting information or register information related to JTAG (Joint Test Action Group), USB (Universal Serial Bus), UART (Universal Asynchronous Receiver/Transmitter), Wi-Fi, or Ethernet is read to confirm that the state of the verification target is the same "invalid" state as the defined state 1023 and to confirm that the state of CAN is the same "valid" state as the defined state 1023. In a case where all the states are the same as the defined state 1023, it is determined that there is no rule violation, and in other cases, it is determined that there is a rule violation.

Here, the key generation condition rule information 102 illustrated in FIG. 6 is an example, and all the verification targets may not necessarily satisfy the defined state. For example, it is assumed that a debug port is included in the verification target. The debug port refers to a signal terminal for communicating with the outside, and information included in the communication is information having higher confidentiality than other signal terminals. In such a case, it is also possible to determine that there is a rule violation when only this debug port is in an invalidation state in which communication with the outside is blocked. As a result, it is possible to prioritize the verification targets, and it is possible to increase the reliability of ensuring confidentiality and reduce the load of calculation processing.

In step 303, when the key generation propriety determination unit 14 determines that there is no rule violation as a result of the comparison in step 302, the process proceeds to step 304, and when it is determined that there is a rule violation, the process proceeds to step 305.

In step 304, the key generation propriety determination unit 14 transitions to a key generation propriety state as a result of the key generation propriety determination processing.

In step 305, the key generation propriety determination unit 14 transitions to a key generation prohibition state as a result of the key generation propriety determination processing.

Through the above steps, the key generation propriety determination unit 14 can determine whether or not the key can be generated based on the state information of the information processing device 1.

FIG. 4 is a flowchart illustrating processing related to recording of evidence information in step 207.

In step 401, the evidence recording unit 16 acquires an evidence content to be generated from the evidence target information 103.

FIG. 7 illustrates a data structure of the evidence target information 103 to be referred to for confirming the evidence content generated in step 401. The evidence target information 103 includes an evidence target ID 1031 for identifying an evidence content and an evidence content 1032 indicating a content of evidence.

In step 402, the evidence recording unit 16 generates evidence according to the evidence content 1032 acquired in step 401 described above. For example, when the evidence target ID 1031 is "0x01", the evidence recording unit 16 generates the key information generated in step 205 as the evidence content 1032. In addition, the evidence recording unit 16 generates the key information 1016 of the secret communication public key ID 1015 for encrypting a response message in step 209 above as the evidence content 1032 when the evidence target ID 1031 is "0x02", state information of the verification target 1022 used for key generation propriety determination in step 203 above as the evidence content 1032 when the evidence target ID 1031 is "0x03", and time information for generating evidence in step 401 above as the evidence content 1032 when the evidence target ID 1031 is "0x04".

Further, the evidence may be information as it is, or the encryption processing unit 17 may generate a digest value generated using one of the key information generated in step 205 as evidence. As the digest, for example, an encryption technique such as Advanced Encryption Standard (AES)-Cipher-based MAC (CMAC) can be used.

In step 403, the evidence recording unit 16 stores the evidence generated in step 402 in the evidence information 104.

FIG. 8 illustrates a data structure of the evidence information 104 that stores evidence in step 403. The evidence information 104 includes an evidence ID 1041 for identifying evidence and evidence information 1042 indicating a digest value of the evidence. In step 210, by transmitting the digest value and the evidence content used to calculate the digest value to the key management device 3, the key management device 3 can calculate a digest value based on the received evidence content using the decrypted key information, verify whether or not the digest value matches the received digest value, and confirm that the evidence content is correct if the digest value matches the received digest value. Note that the evidence information 1042 may not be a digest value, and the evidence information generated in step 402 may be stored as it is.

Through the above steps, the information processing device 1 can record evidence information for verifying that execution is performed in a correct state at the time of key generation.

As described above, according to the first embodiment, in the manufacturing process of the information processing device mounted on the automobile, the key information for security countermeasures can be safely written, and the written key information can be securely notified to the key management device. In addition, the information processing device 1 generates a key only in a safe situation, and can record state information when the key is generated as evidence information. As a result, when a third party or an internal criminal performs a cyberattack in a manufacturing process, it is possible to perform an explanation responsibility based on the evidence information, and it is possible to expect an effect of suppressing the cyberattack.

The Information processing device according to the present invention described above has the following effects.

(1) An information processing device according to the present invention is an information processing device which is capable of generating and managing a key and includes a storage unit that stores a public key received from a key management device, a key generation unit that generates a use key, and a communication unit capable of communicating with the outside. The key generation unit generates a use key in an invalid state in which the communication unit blocks signal input from the outside. The communication unit transmits the use key encrypted with the public key to the key management device.

With the above configuration, it can be expected that leakage of a key is prevented and an unauthorized act is suppressed by generating a key only in a predetermined situation where interference from the outside is not received.

(2) A key management control unit further includes a key management control unit that manages generation of the use key, and the key management control unit prohibits the key generation unit from generating a key when the key generation unit generates the use key a predetermined number of times or more. As a result, by appropriately setting the predetermined number of times, it is possible to prevent the key generation unit from generating a key without limitation, and for example, it is possible to prevent tampering of a key after shipment.

(3) The communication unit includes a plurality of signal terminals, and the key generation unit generates the use key when a signal terminal that transmits and receives information having confidentiality equal to or greater than a predetermined value to and from the outside among the plurality of signal terminals is in an invalidation state. As a result, it is possible to prioritize the signal terminals to be verified, secure confidentiality, and reduce the load of calculation processing.

(4) The Information processing device further includes a storage unit that stores evidence information including and indicating information for specifying the generated use key, and the evidence information includes state information of a signal terminal that transmits and receives information having confidentiality equal to or higher than a predetermined value to and from the outside when the key generation unit generates the use key. Therefore, whether or not the key generation is correctly performed can be determined by comparing the evidence information stored in the information processing device with the information transmitted from the manufacturing site of the third party. Therefore, it is expected that function as the deterrent against the unauthorized act is exerted.

(5) The evidence information includes information of a public key for encrypting the use key. As a result, it is possible to collate the public key of the ECU with the public key of the key management device and determine whether or not the public keys match each other. Therefore, it is possible to determine whether or not the public key on the ECU side has been tampered with by unauthorized access of a third party. In addition, when the key generation unit can generate the use key a plurality of times, the evidence information includes information on the number of times the key generation unit has generated the use key. As a result, similarly to the above, it is possible to determine whether or not a larger number of keys than expected have been generated by unauthorized access of a third party.

(6) The communication unit outputs the evidence information in response to an external request. Accordingly, the present invention can be suitably applied even when the manufacturing site and the manufacturing requester are in a remote state.

(7) The Information processing device further includes a key registration unit that acquires an update key from the outside, and the key management control unit updates the use key to the update key in response to acquisition of the update key by the key registration unit. As a result, even when it is necessary to update the use key, it is possible to easily update the use key without generating a use key again.

Second Embodiment

[Key Management Device 3]

Next, the key management device 3 that is connected to the information processing device 1 described above and manages the use key generated by the information processing device 1 will be described. The key management device 3 transmits a key update command to the information processing device 1 when it is desired to share the key information as key information having the same value as that of another information processing device among pieces of product-specific key information generated by the information processing device 1. Then, in response to the command, the information processing device 1 updates the generated key to common key information shared with another information processing device.

Figure 9:
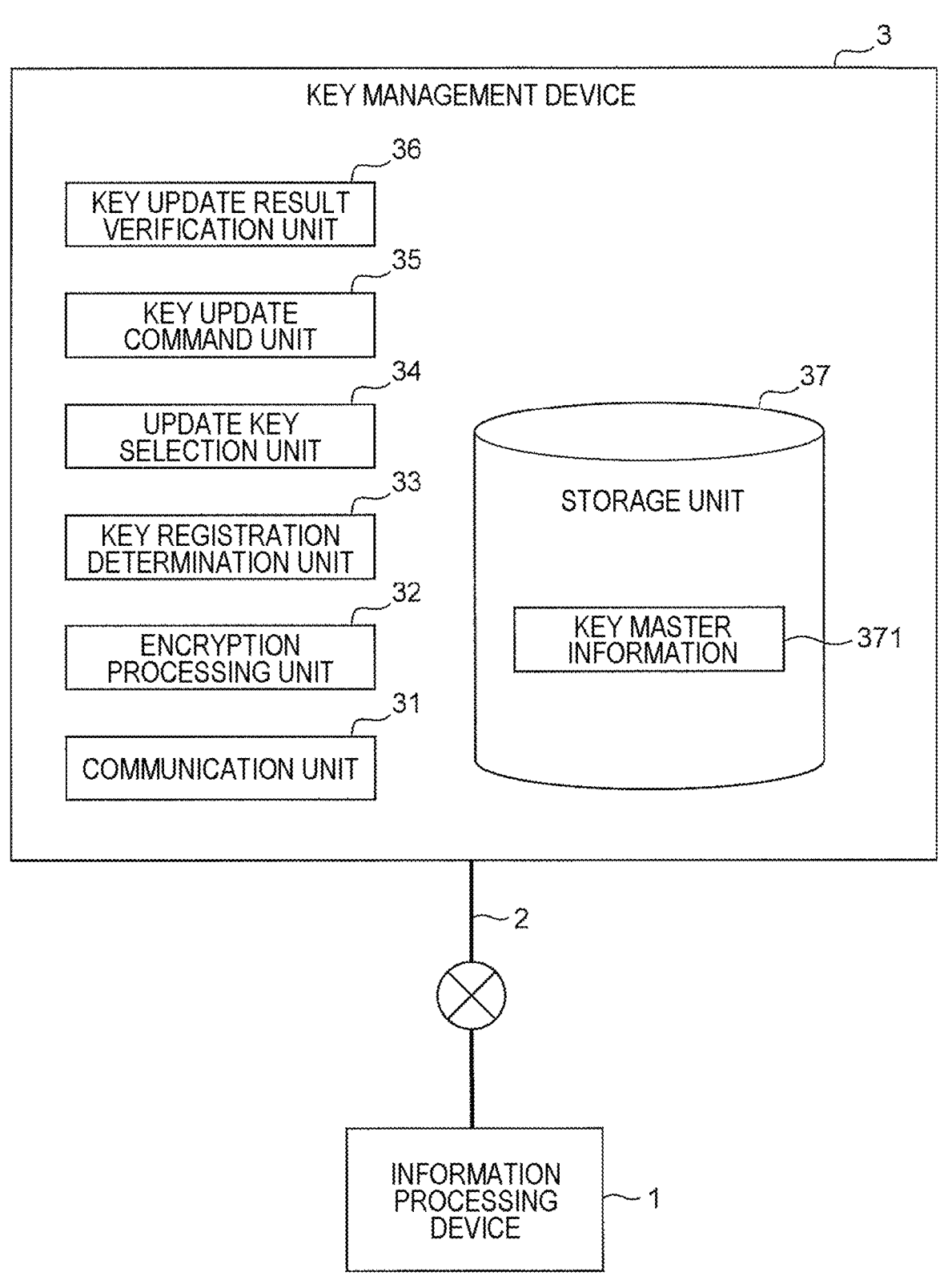
FIG. 9 is a diagram illustrating a configuration of a key management device according to a second embodiment of the present invention.

FIG. 9 is a block diagram illustrating a schematic configuration of a key management device 3 according to an embodiment. The key management device 3 of the present embodiment is connected to the information processing device 1 via the communication bus 2.

The key management device 3 includes calculation means (not illustrated) and storage means (not illustrated). The calculation means includes, for example, a CPU. The storage means includes, for example, a non-volatile memory and a volatile memory. The calculation means executes the program stored in the storage means, whereby the key management device 3 implements the functions described in the present specification.

The key management device 3 includes, for example, an encryption processing unit 32, a key registration determination unit 33, an update key selection unit 34, a key update command unit 35, and a key update result verification unit 36 as functional units thereof. In this specification, it can also be said that processing executed by the CPU or these functional units is executed by the key management device 3.

In addition, the key management device 3 includes a storage unit 37. The storage unit 37 may be entirely non-volatile or partially volatile. Furthermore, the key management device 3 includes a communication unit 31 that is a communication interface and performs calculation necessary for communication.

The functional block diagram illustrated in FIG. 9 is an example, and the unit and name of the function are not limited thereto. For example, the function implemented by the key update result verification unit 36 in the present embodiment may be implemented by another functional unit illustrated in FIG. 9 or may be implemented by a functional unit not illustrated in FIG. 9.

The communication unit 31 transmits and receives messages to and from the information processing device 1 via the communication bus 2. The encryption processing unit 32 performs encryption processing according to a predetermined algorithm. The key registration determination unit 33 determines whether to register the individual key information received from the information processing device 1 as it is or update the individual key information to the common key information. The update key selection unit 34 selects an update key to be notified to the information processing device 1 when the individual key information is to be updated to the common key information. The key update command unit 35 instructs the information processing device 1 to update the update target individual key to the update key. The key update result verification unit 36 verifies that the key update result notified from the information processing device 1 has been correctly updated.

The storage unit 37 stores key master information 371 that stores key information related to all keys used by all the information processing devices.

Similarly, the functional block diagram illustrated in FIG. 9 is an example for the storage unit 37, and the unit and name of the function are not limited thereto. For example, the information held by the key master information 371 in the present embodiment may be held by a functional unit not illustrated in the storage unit 37 in FIG. 9.

Figure 10:
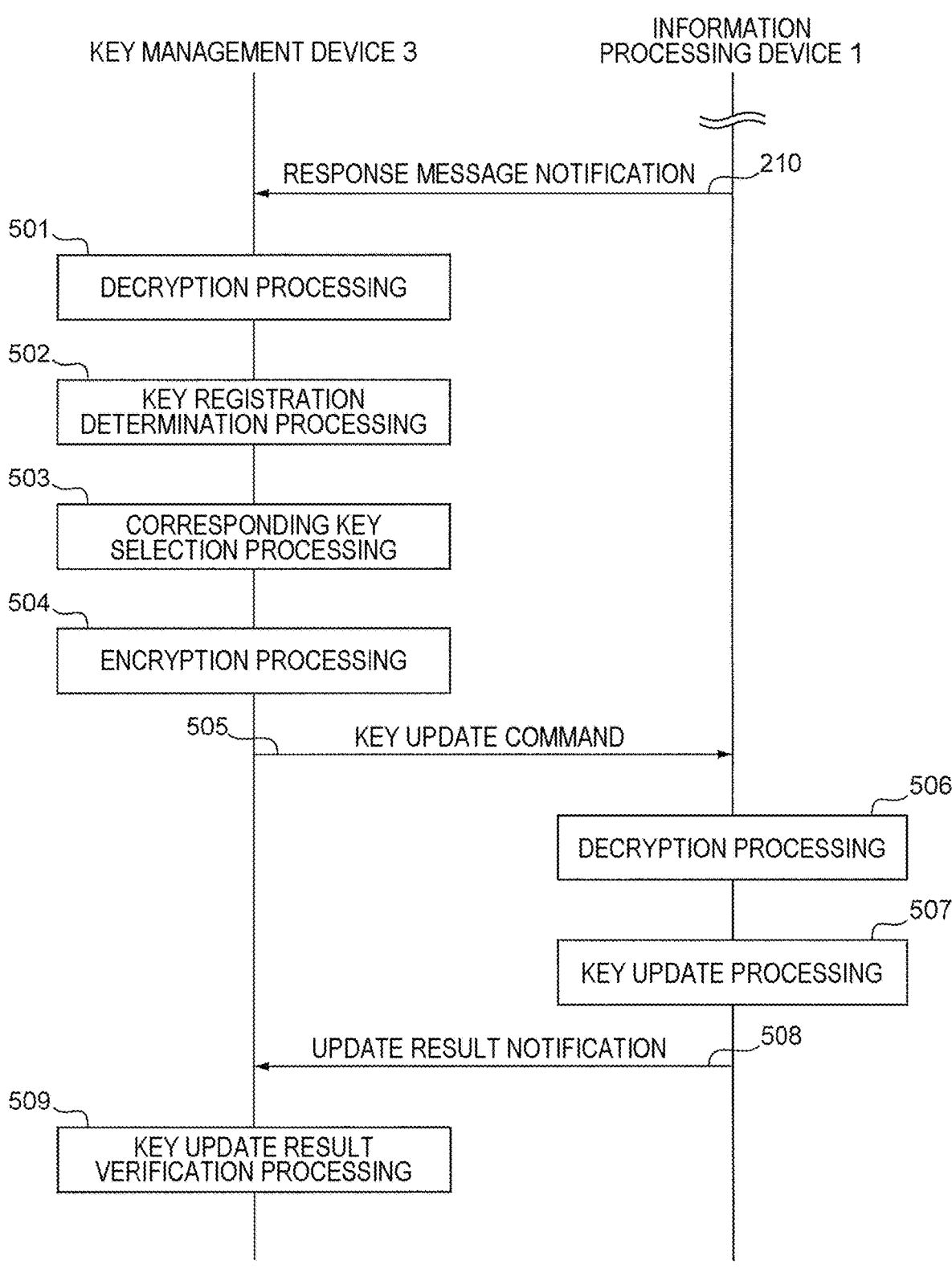
FIG. 10 is a diagram illustrating a schematic processing flow of key update from an individual key to a common key.

FIG. 10 is a sequence diagram of processing of updating an individual key generated by the information processing device 1 to a common key used in common with another information processing device. Note that, in FIG. 10, the same processing as those described in FIG. 2 of the first embodiment are denoted by the same reference numerals, and redundant description is omitted.

Step 210 is the same processing as that in the first embodiment. In step 501, the encryption processing unit 32 receives the encrypted response message from the information processing device 1 via the communication unit 31. Then, the encrypted response message is decrypted according to a predetermined algorithm using a secret key to be paired with public key information 1016 set in the secret communication public key ID 0x01.

In step 502, the key registration determination unit refers to the key master information 371 to determine whether or not each piece of key information received from the information processing device 1 is to be registered as an individual key or updated to a common key.

FIG. 11 illustrates a data structure of the key master information 371 which is referred to in order to determine whether or not the key can be registered in step 502. The key master information 371 includes a product ID 3711 for identifying the information processing device 1, a key slot ID 3712 for identifying a key stored in the information processing device 1, a key type 3713 for identifying whether or not to change to a common key, and key information 3714 for recording key information registered in the information processing device 1.

In step 503, the update key selection unit 34 selects an update key when determining that key update is necessary instead of registration in step 502.

For example, processing when a response message received from the information processing device 1 with the product ID "A41" is decrypted and the key-related information is acquired from the response message in steps 501 to 503 will be described. For example, for the keys with the common key slot ID 1011 of "0x01" and "0x02" of the information processing device 1, since the key type 3713 is "individual", the key information 1012 is registered in the key information 3714 as an individual key (see FIG. 5). Since the key type 3713 of the key with the common key slot ID 1011 of "0x03" is "shared", it is determined that the key needs to be updated, and key information registered in advance in the key information 3714 for the information processing device 1 is selected as an update key. Note that, when key information for update request is not generated in advance, an update key may be generated in step 502 described above.

In step 504, the encryption processing unit 32 encrypts the update key information selected in step 503 using one of the keys generated by the information processing device 1 received in step 210, and adds a signature to the encrypted update key information using one of the keys similarly generated by the information processing device 1 to generate key update command information. For example, AES-CBC may be used as the encryption algorithm, and AES-CMAC may be used as the signature addition. Furthermore, a communication message including a data format (M1, M2, M3) according to the MUP of the SHE protocol may be generated as the key information which is encrypted and to which the signature is added in step 504.

In step 505, the key update command unit 35 notifies the information processing device 1 of the update instruction information generated according to a predetermined algorithm in step 504 via the communication unit 31.

In step 506, the key management control unit 12 of the information processing device 1 uses the encryption processing unit 17 to decrypt and signature-verify the key update command information received from the key management device 3 according to a predetermined algorithm.

In step 507, when the signature verification in step 506 is correct, the key management control unit 12 registers the update key instructed from the key management device 3 in the key-related information 101 using the key registration unit 15. For example, the key information 1012 is overwritten with the key information 3714 with the common key slot ID 1011 of "0x03" received from the key management device 3.

In step 508, the key management control unit 12 notifies the key management device 3 of the result of the key update in step 507 via the communication unit 11. For example, a communication message including a data format (M4, M5) according to the MUP of the known SHE protocol may be notified.

In step 509, the key update result verification unit 36 of the key management device 3 verifies whether or not the key has been correctly updated based on the update result notified in step 508 above, and completes the key update in a case where it is determined that the key has been correctly updated. For example, according to the MUP of the SHE protocol, M5' is generated using M4 received in step 508 and the key information used in step 504, and when M5 and M5' match, it is determined that the key update has been correctly performed.

Through the above steps, the individual key generated by the information processing device 1 can be safely updated to the same common key as that of another information processing device. In addition, instead of the common key used in the plurality of information processing devices, update to individual key information designated in advance by the key management device 3 may be performed. In this case, the key management device does not necessarily need to be connected to a plurality of information processing devices.

As described above, the key management device 3 determines whether to register the individual key as it is or update the individual key to the common key based on the response message from the information processing device 1, and the information processing device 1 can update only the key of the target slot to the common key based on the key update command from the key management device 3. As a result, a common key can be used for a use in which it is desired to use a key to be shared by a plurality of Information processing devices, an individual key can be used for a use in which it is desired to use a key different for each Information processing device, and it can be expected that the influence at the time of key leakage is limited to one Information processing device for a use in which the individual key is used rather than using the common key for all uses.

The key management device according to the present invention described above has the following effects.

(8) A key management device is capable of communicating with the information processing device according to (1), and includes: a communication unit that acquires the use key generated by the key generation unit from the information processing device; and a key update command unit that outputs a key update command to the information processing device, the key update command updating the acquired use key to an update use key of a type different from the use key.

As a result, even in a case where the key generated by the information processing device is a key of a type different from the key assumed by the key management device, the key can be generated again by suitably adopting the present invention on the information processing device side by the update command, and the key information with confidentiality can be safely written in the product even in a manufacturing environment in which there is a possibility that its own company's control does not work like the EMS.

(9) The key management device further includes a key registration determination unit that determines whether or not the use key needs to be updated. As a result, it is possible to update only a use key that needs to be updated, and a processing load can be reduced.

(10) The key management device further includes a storage unit that stores key master information in which a key type of a use key that can be generated by the key generation unit is registered, and the key registration determination unit specifies the key type of the use key acquired by the communication unit based on the key master information and determines the update use key to be output. As a result, by registering the key master information in advance, it is possible to specify the key type of the use key in preparation. Further, even when a key with a wrong key value is generated due to a malfunction, it is possible to discard the key as a key not registered in the key master information.

(11) The key management device is connected to a plurality of the information processing devices, and the key type includes at least a common key commonly used by the plurality of information processing devices and an individual key different for each of the plurality of information processing devices. As a result, an individual key can be used for a use in which it is desired to use a key different for each Information processing device, and it can be expected that the influence at the time of key leakage is limited to one Information processing device for a use in which the individual key is used rather than using the common key for all uses.

Note that the present invention is not limited to the above-described embodiments, and various design changes can be made without departing from the spirit of the present invention described in the claims. For example, the above-described embodiments have been described in detail in order to help understanding of the present invention, and are not necessarily limited to those having all the described configurations. In addition, a part of the configuration of a certain embodiment can be replaced with the configuration of another embodiment, and the configuration of another embodiment can be added to the configuration of a certain embodiment. In addition, it is possible to add, delete, and replace other configurations for a part of the configuration of each embodiment.

REFERENCE SIGNS LIST 1 information processing device
2 communication bus
3 key management device
11, 31 communication unit
12 key management control unit
13 key generation unit
14 key generation propriety determination unit
15 key registration unit
16 evidence recording unit
17 encryption processing unit
33 key registration determination unit
35 key update command unit
37, 100 storage unit

The invention claimed is:

1. An information processing device that generates and manages a key, the information processing device configured to:
    store a public key received from a key management device;
    identify a verification target comprising a plurality of ports of the information processing device;
    compare a communication state of the plurality of ports to a defined state;
    in response to determining that the information processing device is in an invalid state based on determining that the communication state of the plurality of ports matches the defined state:
        generate a use key;
        encrypt the use key with the public key; and
        transmit the use key encrypted with the public key to the key management device.

2. The information processing device according to claim 1, further configured to:
    manage generation of the use key; and
    prohibit generation of a key when the use key is generated a predetermined number of times or more.

3. The information processing device according to claim 1, wherein the information processing device includes a plurality of signal terminals, and is further configured to:
    generate the use key when a signal terminal that transmits and receives information having confidentiality equal to or greater than a predetermined value to and from the outside among the plurality of signal terminals is in the invalid state.

4. The information processing device according to claim 3, further further configured to:
    store evidence information including information for specifying the generated use key,
    wherein the evidence information includes state information of a signal terminal that transmits and receives information having confidentiality equal to or higher than a predetermined value to and from the outside when the use key is generated.

5. The information processing device according to claim 4, wherein the evidence information includes information of a public key for encrypting the use key.

6. The information processing device according to claim 4, further configured to:
    generate the use key a plurality of times, wherein the evidence information includes information on the number of times the use key has been generated.

7. The information processing device according to claim 4, further configured to:
    output the evidence information in response to an external request.

8. The information processing device according to claim 2, further further configured to:
    acquire an update key from the outside; and
    update the use key to the update key in response to acquisition of the update key.

9. The information processing device according to claim 1, further comprising:
    a key management device, the key management device configured to:
        communicate with the key management device;
        acquire the use key generated by the information processing device; and
        output a key update command to the information processing device, the key update command updating the acquired use key to an update use key of a type different from the use key.

10. The information processing device according to claim 9, further configured to:
    determine whether or not the use key needs to be updated.

11. The information processing device according to claim 10, further configured to:
    store key master information in which a key type of a use key that can be generated is registered; and
    specify the key type of the use key based on the key master information and determines the update use key to be output.

12. The information processing device according to claim 11,
    wherein the key management device is connected to a plurality of the information processing devices, and
    wherein the key type includes at least a common key commonly used by the plurality of information processing devices and an individual key different for each of the plurality of information processing devices.

13. The information processing device according to claim 1, wherein the plurality of ports include at least one of JTAG (Joint Test Action Group), USB (Universal Serial Bus), UART (Universal Asynchronous Receiver/Transmitter), Wi-Fi, and Ethernet.

* * * * *